(12) United States Patent
Saito

(10) Patent No.: US 8,068,243 B2
(45) Date of Patent: Nov. 29, 2011

(54) IMAGE FORMING APPARATUS, IMAGE FORMING METHOD AND STORAGE MEDIUM

(75) Inventor: Daijiro Saito, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 832 days.

(21) Appl. No.: 12/142,526

(22) Filed: Jun. 19, 2008

(65) Prior Publication Data
US 2009/0009830 A1    Jan. 8, 2009

(30) Foreign Application Priority Data
Jul. 5, 2007    (JP) .................... 2007-177343

(51) Int. Cl.
G06F 3/12    (2006.01)
H04N 1/46    (2006.01)
G06K 15/00    (2006.01)

(52) U.S. Cl. .......... 358/1.13; 358/2.1; 358/509

(58) Field of Classification Search .......... 358/1.9, 358/2.1, 1.13, 475, 481, 474, 509, 530, 518
See application file for complete search history.

(56) References Cited

U.S. PATENT DOCUMENTS

| 6,970,660 B2 * | 11/2005 | Harada et al. ............... 399/49 |
| 7,782,380 B2 * | 8/2010 | Hunter et al. ............... 348/251 |
| 7,920,305 B2 * | 4/2011 | Ishida et al. ............... 358/481 |
| 2003/0226959 A1 * | 12/2003 | Kimura ............... 250/234 |

FOREIGN PATENT DOCUMENTS

| JP | 11-179975 | 7/1999 |
| JP | 2007-3896 | 1/2007 |

* cited by examiner

Primary Examiner — Jerome Grant, II
(74) Attorney, Agent, or Firm — Finnegan, Henderson, Farabow, Garrett & Dunner, L.L.P.

(57) ABSTRACT

Disclosed is an image forming apparatus including an image forming section in which writing units are disposed in a sub-scanning direction for each color, the writing units having writing elements arranged in a main scanning direction, and which forms a color image by superimposing an image of each color formed by the writing units, an image converting section to convert an input image data to an image data of a color which corresponds to each writing unit, a storage section to store information according to an arrangement of the writing elements for each writing unit, a correction section to correct an output timing for each pixel of converted the image data for each color based on the information according to the arrangement of the writing elements for each writing unit, a setting section to set an operation mode according to an image forming and a control section to control a correction based on the operation mode.

17 Claims, 13 Drawing Sheets

FIG.8
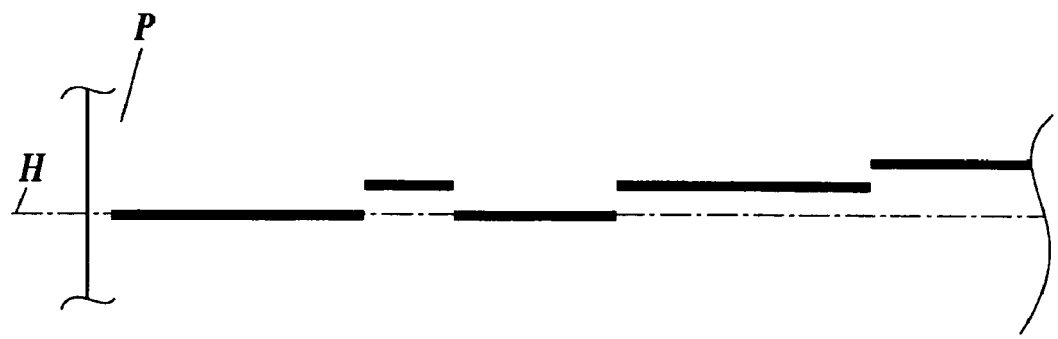
⇩ FORMED IMAGE AFTER BOW CORRECTION IS CARRIED OUT
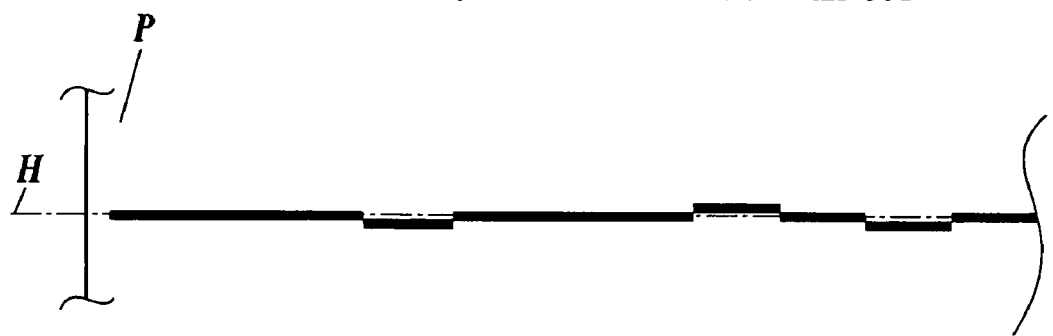

FIG.9
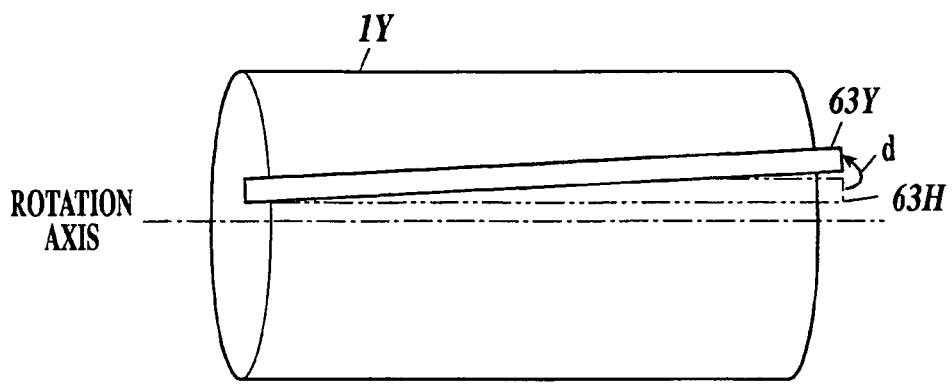
⇩ FORMED IMAGE WITHOUT SKEW CORRECTION
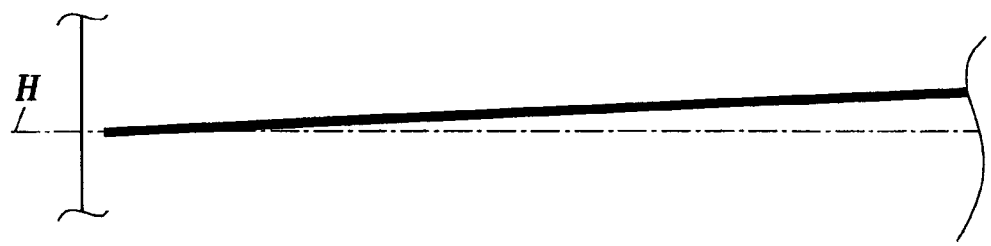
⇩ FORMED IMAGE AFTER SKEW CORRECTION IS CARRIED OUT

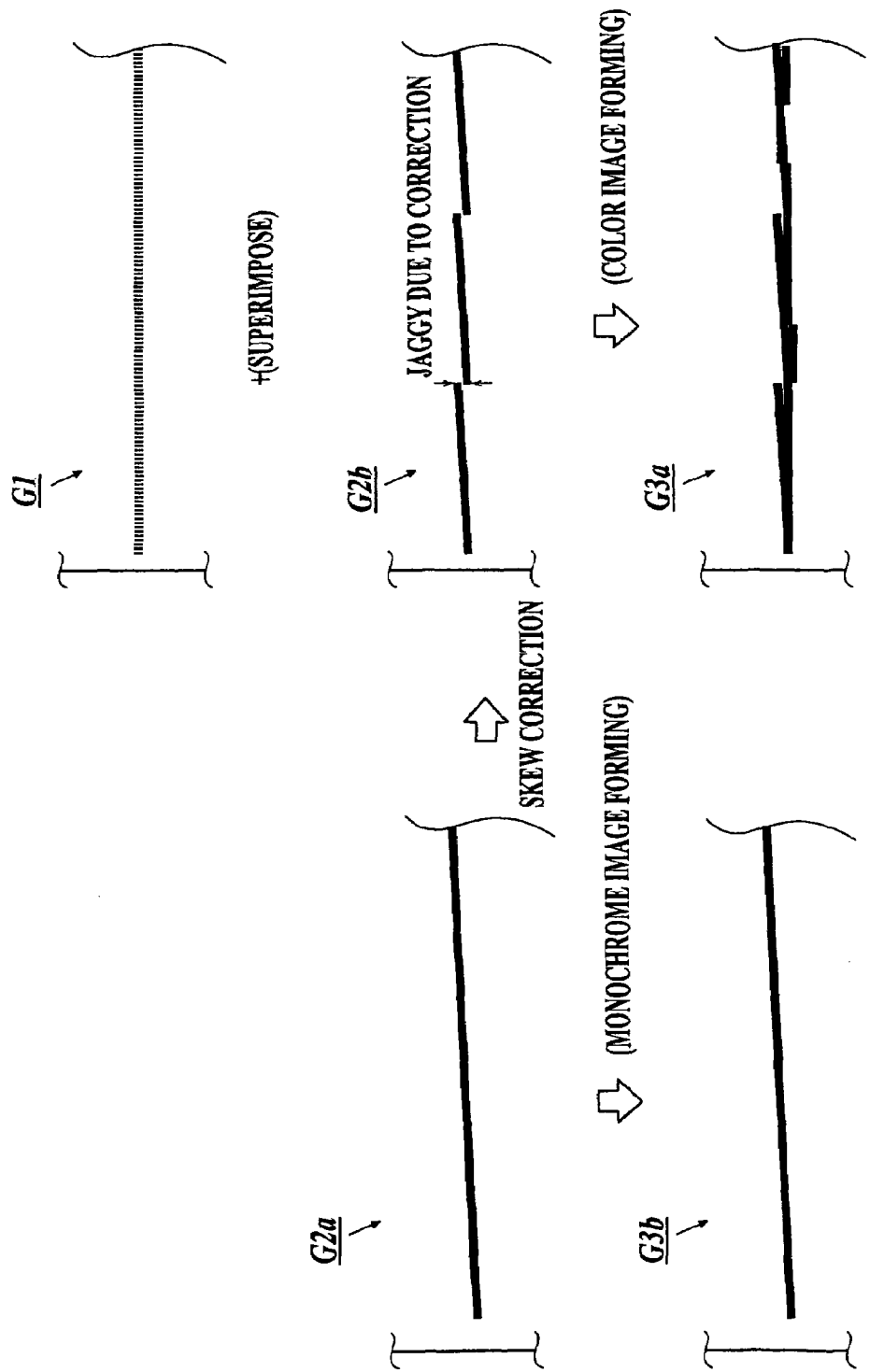

IMAGE FORMING APPARATUS, IMAGE FORMING METHOD AND STORAGE MEDIUM

BACKGROUND OF THE INVENTION

1. Field of the Invention

The present invention relates to an image forming apparatus, an image forming method and a storage medium.

2. Description of Related Art

Conventionally, there is an image forming apparatus which forms an electrostatic latent image on a photoconductor drum by a light emitting diode (hereinafter, called "LED") head writing optical system in which writing elements such as a plurality of LED or the like are arranged in a line form, and which forms an image by transferring and fixing the toner image which is formed by toner being attached to the electrostatic latent image to a recording medium (hereinafter, called "paper") such as paper or the like. In this image forming apparatus, a color image is formed on a paper by transferring each color of Y (yellow), M (magenta), C (cyan) and K (black) by the LED head writing optical system in which the writing elements of each color are arranged in a line form so that the colors overlap.

In the image forming apparatus which uses the LED head writing optical system, the image forming to the paper is influenced by dispersion in arrangement of each writing element and by a misplacement of the writing optical system itself. Specifically, when a number of colors are superimposed to form an image, a minor displacement of pixels of each color becomes noticeable as a color shift. Therefore, in the image forming apparatus, a correction of the writing position of the pixels based on the shifting amount measured in advance is carried out.

Particularly, there are a correction to shift the pixel forming position in the main scanning direction/sub-scanning direction based on the shifting amount in the main scanning direction/sub-scanning direction, a correction (hereinafter called "skew correction") of the image forming position based on the inclining amount of the setting position of the LED head writing optical system, a correction (hereinafter, called "bow correction") of the pixel forming position based on the dispersion in arrangement of the writing element and the like. Further, JP11-179975A and JP2007-3896A discloses a technique to correct the forming position of the pixel in the image forming apparatus in which a color image is formed on a paper.

In the correction using the above described conventional technique, a phenomenon called jaggy in which the outline portion of the letter appears to be zigzag due to the skew/bow correction can easily occur. However, when an image is formed by superimposing multiple colors, the jaggy which occurred in any one of the colors was not noticeable due to one color being superimposed by the other colors even when the skew/bow correction is carried out.

However, when the image is formed using one color, there is a problem that only jaggy becomes noticeable by carrying out the skew/bow correction because other colors are not superimposed.

SUMMARY OF THE INVENTION

In view of the above described problem in the convention technique, an object of the present invention is to improve the jaggy which occurs when an image is formed in one color by the image forming apparatus which forms a color image.

In order to achieve the above object, according to a first aspect of the present invention, there is provided an image forming apparatus comprises an image forming section in which a plurality of writing units are disposed in a sub-scanning direction for each color, the writing units having writing elements arranged in a main scanning direction, and which forms a color image by superimposing an image of each color which is formed by using the plurality of writing units, an image converting section to convert an input image data to an image data of a color which corresponds to each of the plurality of writing units, a storage section to store information according to an arrangement of the writing elements for each writing unit, a correction section to correct an output timing for each pixel of the image data for each color which is converted by the image converting section based on the information according to the arrangement of the writing elements for each writing unit, a setting section to set an operation mode according to an image forming in the image forming section and a control section to control a correction in the correction section based on the operation mode set by the setting section.

In accordance with the first aspect of the present invention, the correction of driving data of each of the plurality of writing units based on the information according to the arrangement of the writing elements of the plurality of writing units which are set in advance can be controlled based on the set operation mode, and improvement of the jaggy can be attempted by controlling the correction by the setting of the operation mode when the jaggy has occurred remarkably by the correction.

BRIEF DESCRIPTION OF THE DRAWINGS

FIG. 8 is a schematic view exemplifying a formed image after the bow correction is carried out.

FIG. 9 is a schematic view exemplifying an outline of a skew correction.

FIG. 13 is a schematic view exemplifying a formed image of the color copier.

DESCRIPTION OF THE PREFERRED EMBODIMENT

Hereinafter, an embodiment of the invention will be described with reference to the drawings. However, the invention is not limited to the following embodiment. Further, the embodiment shows the best mode of the embodiment according to the present invention, and the usage of the invention and the terms are not limited to the following description.

Figure 1:
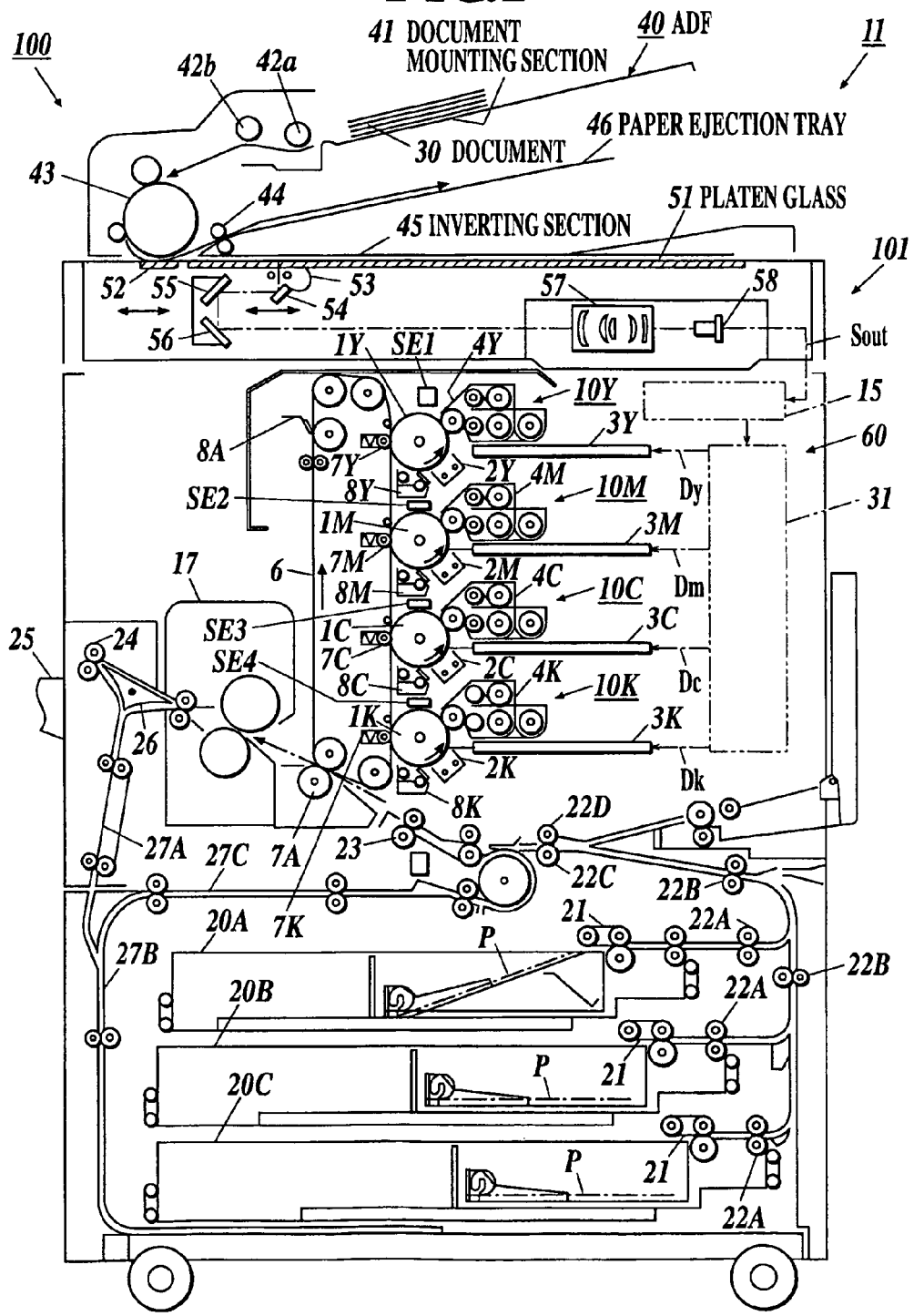
FIG. 1 is a schematic view showing an inner structure of a color copier according to the embodiment.
Figure 2:
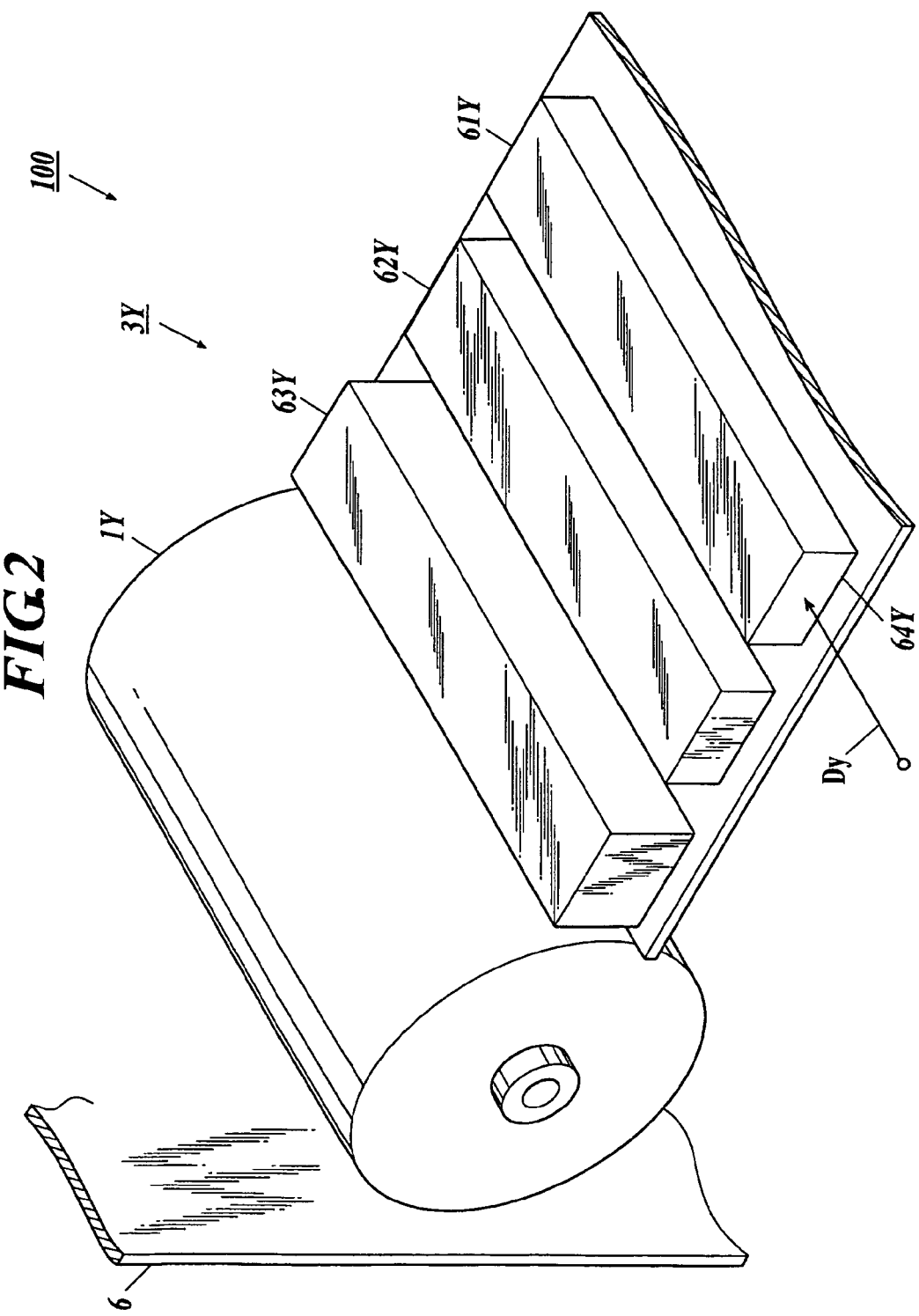
FIG. 2 is a schematic view showing a structure of a writing unit.

First, a structure of a color copier which is an example of an image forming apparatus which forms a color image on a paper will be described with reference to FIGS. 1 and 2. FIG. 1 shows an inner structure of the color copier 100. FIG. 2 exemplifies a structure of the writing unit 3Y in the color copier 100.

As shown in FIG. 1, the color copier 100 is an apparatus to form an image by superimposing colors on one another on a paper based on the image information obtained by reading the image of the document 30 or based on the image information input from other information device through communication.

Here, in the embodiment, the color copier 100 which is a multifunctional peripheral (MFP) having a function of the above described so-called copying and printing and the like is exemplified. However, the present invention can be applied to a facsimile apparatus, an apparatus such as a simple copier or a simple printer and the like as long as it is an image forming apparatus which forms an image on a paper, and the application of the present invention is not specifically limited.

The color copier 100 includes the copier main body 101. At an upper portion of the copier main body 101, an image input section 11 for color printing and an ADF 40 (automatic document feeding section) are disposed. The ADF 40 operates so as to automatically feed one or a plurality of documents 30 in the ADF mode. Here, the ADF mode indicates an operation mode to automatically read the document image by automatically feeding the document 30 which is mounted on the ADF 40.

The ADF 40 comprises a document mounting section 41, a roller 42a, a roller 42b, a roller 43, a conveyance roller 44 and a paper ejection tray 46. On the document mounting section 41, one or a plurality of document 30 is mounted. At a downstream side of the document mounting section 41, the roller 42a and the roller 42b are provided. When the ADF mode is selected, the document 30 which is fed out from the document mounting section 41 is conveyed by the roller 43 at the down stream side so as to rotate in a U-shape. Here, when the ADF mode is selected, the document 30 is mounted on the document mounting section 41 so as to have the recording surface faced upward.

Moreover, the image input section 11 operates so as to read the color image formed on the document 30. For the image input section 11, a slit scan type scanner for color printing is used, for example. The image input section 11 comprises an image sensor 58 which is arranged in an array, and for example, the surface of the document 30 is read to output the image reading signal Sout when the document 30 is inverted in the U-shape by the roller 43 in the ADF mode. For the image sensor 58, the 3 line color CCD (Charge Couple Device) image pickup device is used, for example.

The image sensor 58 comprises three reading sensors to detect each color of red (R), green (G) and blue (B) which is constituted by a plurality of light receiving elements being arranged in the main scanning direction. The optical information of the color R, the color G and the color C can be read at the same time by breaking down the pixels at the different positions in the sub-scanning direction which is orthogonal to the main scanning direction.

The document 30 which is read by the image input section 11 is ejected to the paper ejection tray 46 by being conveyed by the conveyance roller 44. Further, the image sensor 58 outputs the image reading signal of the RGB color system which is obtained by reading the document 30 in the platen mode. Here, the platen mode is an operation mode to automatically read the document image by scanning the document 30 which is mounted on the platen glass by the optical drive system.

The image input section 11 comprises a first platen glass 51, a second platen glass 52 (ADF glass), a light source 53, mirrors 54, 55 and 56, an imaging optics section 57 and an optical drive section (omitted from the drawing) other than the image sensor 58. The light source 53 operates so as to irradiate light to the document 30. The optical drive section operates so as to relatively move the document 30 or the image sensor 58 in the sub-scanning direction. Here, the sub-scanning direction is a direction which is orthogonal to the main scanning direction, the arrangement direction of a plurality of light receiving elements which constitute the image sensor 58 being in the main scanning direction. In such way, the document 30 mounted on the document mounting section 41 of the ADF 40 is conveyed by the above rollers 42a, 42b and 43 and the conveyance roller 44, the image on one side or on both sides of the document 30 is scanned by light exposure by the optical system of the image input section 11, and the incident light which reflects the document image is made to enter the image sensor 58.

The image sensor 58 carries out the photoelectric conversion to the incident light and outputs an analog signal according to the amount of light of the incident light. The image process section 31 is connected to the image sensor 58 via the control section 15, and the analog image signal obtained by the photoelectric conversion is converted to the digital image signal by having the A/D conversion carried out. Then, the shading correction, the variable power process and the like are carried out in the image process section 31 to be output as the digital image data of the color R, the color G and the color B components. The image process section 31 converts the image data into the image data Dy, Dm, Dc and Dk for colors Y (yellow), M (magenta), C (cyan) and K (black) by the three dimensional color information conversion table, and the image data Dy, Dm, Dc and Dk obtained by the color conversion are transferred to the writing units 3Y, 3M, 3C and 3K which constitute the image forming section 60.

The copier main body 101 is a so-called tandem type color image forming apparatus. The image forming section 60 is provided in the copier main body 101. The image forming section 60 forms the color image based on the image data Dy, Dm, Dc and Dk obtained by reading the color image of the document 30 using the image input section 11. The image forming section 60 comprises the image forming sections 10Y, 10M, 10C and 10K to form the image on a paper for each color, the endless intermediate transfer body 6 and the fixing device 17 to transfer the toner image which is formed on the intermediate transfer body 6 and to fix the toner image on the paper by heating.

The image forming section 10Y to form an image of color yellow (Y) comprises the photoconductor drum 1Y as an image forming body to form a toner image of color Y, the charging section 2Y for color Y which is disposed at a periphery of the photoconductor drum 1Y, the writing unit 3Y, the developing section 4Y and the cleaning section 8Y for the image forming body. The image forming section 10M to form an image of color magenta (M) comprises the photoconductor drum 1M as an image forming body to form s toner image of color M, the charging section 2M for color M, the writing unit 3M, the developing section 4M and the cleaning section 8M for the image forming body.

The image forming section 10C to form an image of color cyan (C) comprises the photoconductor drum 1C as an image forming body to form the toner image of color C, the charging section 2C for color C, the writing unit 3C, the developing section 4C and the cleaning section 8C for the image forming body. The image forming section 10K to form an image of color black (K) comprises the photoconductor drum 1K as an image forming body to form a toner image of color K, the charging section 2K for color K, the writing unit 3K, the developing section 4K and the cleaning section 8K for the image forming body.

The charging section 2Y and the writing unit 3Y, the charging section 2M and the writing unit 3M, the charging section 2C and the writing unit 3C and the charging section 2K and the writing unit 3K form an electrostatic latent image on each of the photoconductor drum. For the writing units 3Y, 3M, 3C and 3K, the LED array head optical system is used, wherein the light emitting elements (light emitting elements for writing) for carrying out the image forming in a line form in the main scanning direction orthogonal to the conveyance direction (sub-scanning direction) of the paper on which the image is to be formed are arranged in the LED array head optical system.

The development by the developing sections 4Y, 4M, 4C and 4K is carried out by the reversal development in which the development bias is applied, wherein the AC voltage is superimposed onto the direct voltage having a same polarity (for example, a negative polarity) as the toner polarity of the toner to be used. The intermediate transfer body 6 is wound by a plurality of rollers, supported so as to rotate, and is made to transfer the toner image of color Y, color M, color C and color K which are formed on each photoconductor drum 1Y, 1M, 1C and 1K.

Here, the arrangement condition of the light emitting elements in the writing units 3Y, 3M, 3C and 3K is different between the writing units of each color. The arrangement condition of the light emitting elements includes the element density per length unit, that is the resolution level, the length between the light emitting elements at both ends in the main scanning direction, that is the maximum writable width, the displacement of each light emitting element with respect to the main scanning direction/the sub-scanning direction and the like.

The difference in the arrangement condition of the light emitting elements specific to each writing unit is attributed to the manufacture error such as a specification error and the like attributed to the measurement conversion when the writing unit is manufactured so that the light emitting elements are arranged in 600 dpi (Dots Per Inch), 1200 dpi in advance, the setting error which occurs when the writing unit is set and the like. As for the information specific to each writing unit, the data which is measured in advance is stored in the after mentioned storage section.

At an upper portion of the photoconductor drums 1Y, 1M, 1C and 1K, the sensors SE1, SE2, SE3 and SE4 which are an optical sensor or the like to detect the maximum width of development in the main scanning direction by the developing sections 4Y, 4M, 4C and 4K, that is the above mentioned the maximum writable width, are provided. The sensors SE1, SE2, SE3 and SE4 are provided in a line form in the main scanning direction of the position about the maximum width of the development carried out in the developing sections 4Y, 4M, 4C and 4K. Further, the sensors SE1, SE2, SE3 and SE4 detects the attachment condition of toner at the time when the development is carried out in a maximum width in the main scanning direction and outputs the detection signal to the after mentioned control section.

The sensors SE1, SE2, SE3 and SE4 not only detect the maximum writable width. Further, the sensors SE1, SE2, SE3 and SE4 are set at a predetermined position in the main scanning direction, and the sensors may detect the difference between the resolution level in the design and the actual resolution level by detecting the shift of a predetermined patter image formed by the developing sections 4Y, 4M, 4C and 4K and the sensors may output the detected signal to the control section.

Here, an outline of the image forming process will be described. The images of each color formed by the image forming sections 10Y, 10M, 10C and 10K are sequentially transferred on the intermediate transfer body 6, which rotates, by the primary transfer rollers 7Y, 7M, 7C and 7K in which the primary transfer bias (omitted from the drawing) having a polarity (for example, positive polarity) opposite of the polarity of the toner to be used is applied, and the color image (color image, color toner image) is formed by the colors being overlapped (primary transfer).

Moreover, at a lower side of the image forming section 60, the paper trays 20A, 20B and 20C to store the papers to be conveyed to the image forming section 60 are provided. The paper P contained in the paper tray 20A and the like are fed by the sending out roller 21 and the paper feeding roller 22A which are provided at the paper tray 20A and the like and are conveyed to the secondary transfer roller 7A via the conveyance rollers 22B, 22C and 22D, the resist roller 23 and the like. Then, the color image is transferred onto the one surface (for example, front surface) of the paper P from the intermediate transfer body 6 at once (secondary transfer).

The fixing process by heating is carried out to the paper P in which the color image is transferred by the fixing device 17, and the paper P is mounted on the paper ejection tray 25 which is outside of the apparatus by being sandwiched by the paper ejection roller 24. The transfer residual toner remained on the periphery surface of the photoconductor drums 1Y, 1M, 1C and 1K after the transfer is removed by the cleaning sections 8Y, 8M, 8C and 8K and the process proceeds to the next image forming cycle.

When forming an image on both surfaces, the paper P which is ejected from the fixing device 17 is branched from the paper ejection path by the branching section 26 after an image is formed on the one surface (for example, the front surface). Next, the paper P passes through the circulated paper path 27A at the lower side and the front and back of the paper P are inverted by the inverting conveyance path 27B which is the paper re-feeding mechanism (ADU mechanism). Then, the paper P passes through the paper re-feeding conveyance section 27C and joins the above mentioned transferring path from the conveyance roller 22D. The paper P which is conveyed so as to be inverted is conveyed again to the secondary transfer roller 7A via the resist roller 23, and the color image is transferred on the other surface (back surface) of the paper P at once.

As for the paper P in which an image is formed, a thin paper of about 52.3 to 63.9 kg/m2 (1000 sheets), a regular paper of about 64.0 to 81.4 kg/m2 (1000 sheets), a thick paper of about 83.0 to 130.0 kg/m2 (1000 sheets) or a super thick paper of about 150.0 kg/m2 (1000 sheets) is used. As for the thickness (paper thickness) of the paper P, a paper having a thickness about 0.05 to 0.15 mm is used.

Here, a periphery structure of the image forming section which forms the image will be described with reference to the periphery of the writing unit 3Y as an example. The structure to form a color image other than color Y is approximately the same as the structure of color Y. Therefore, the explanations are omitted in the following description.

As shown in FIG. 2, the writing unit 3Y is provided at the position opposite of the photoconductor drum 1Y. The writing unit 3Y comprises the IC mounting board 64Y. The resister array 61Y which is in the form of the semiconductor integrated circuit (IC), the latch circuit 62Y and the LED head 63Y are mounted on the IC mounting board 64Y and are connected by the printed wiring (omitted from the drawing) or the like. For the writing unit 3Y and the like, the LED array head optical unit in which 7500 pixels of the light emitting elements (LED) having a resolution level of 600 dpi in A4 size are arranged in a line form in the main scanning direction is used, for example. The LED array head optical unit generates the LED light for forming one line of the color Y line in each strength level based on the image data for one line at once.

The LED light for color Y exposes light to one line of the photoconductor drum 1Y at once and forms the electrostatic latent image in a line form in the main scanning direction. The electrostatic latent image in a line form formed on the photoconductor drum 1Y is developed as a toner image for color Y by the developing section 4Y shown in FIG. 1. The toner image for color Y which is developed by the developing section 4Y is transferred to the intermediate transfer body 6.

Figure 3:
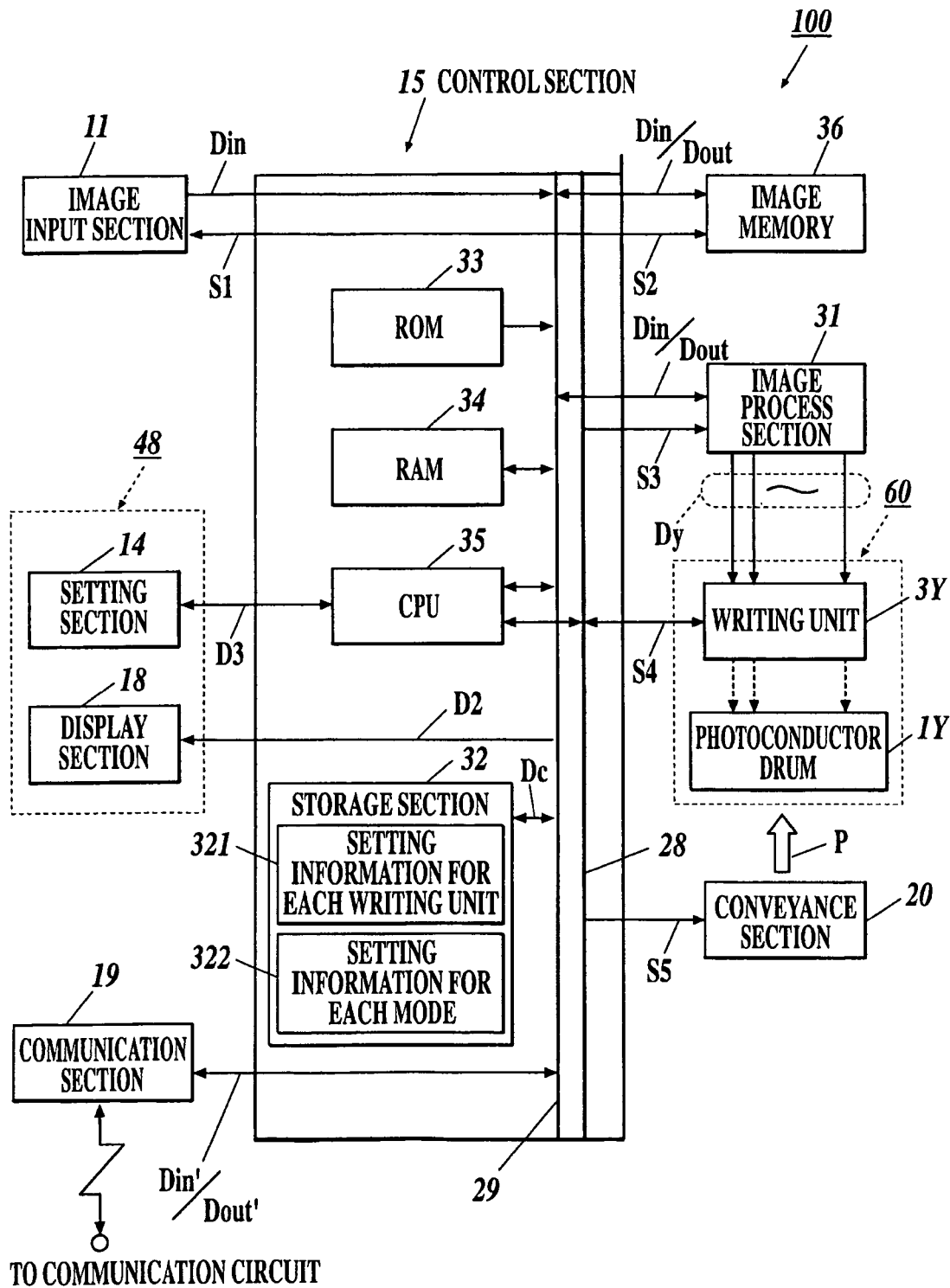
FIG. 3 is a block diagram schematically showing a structure of a control system of the color copier.
Figure 4:
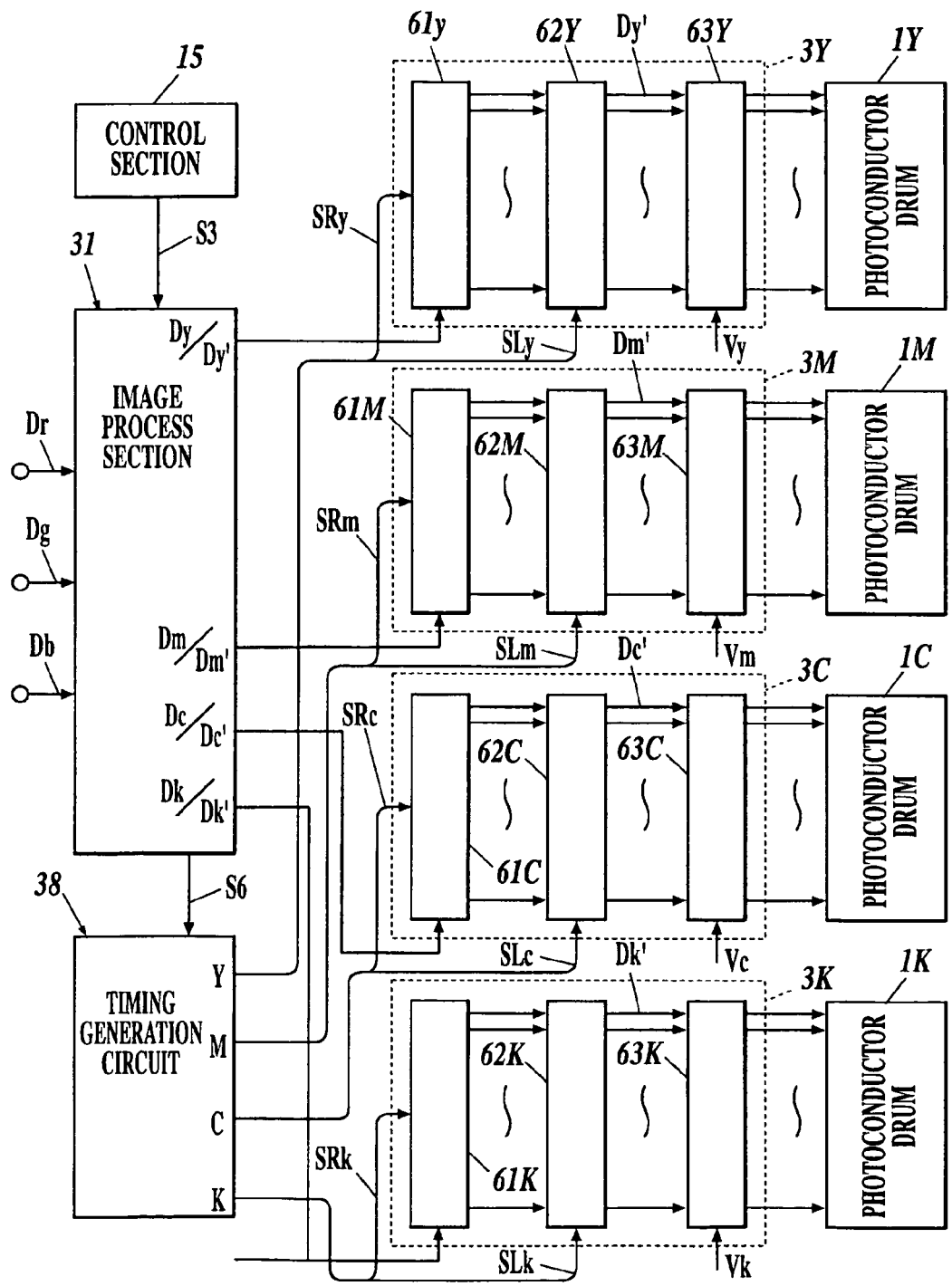
FIG. 4 is a block diagram exemplifying a structure of writing unit for each of colors Y, M, C and K and a surrounding circuit.
Figure 5:
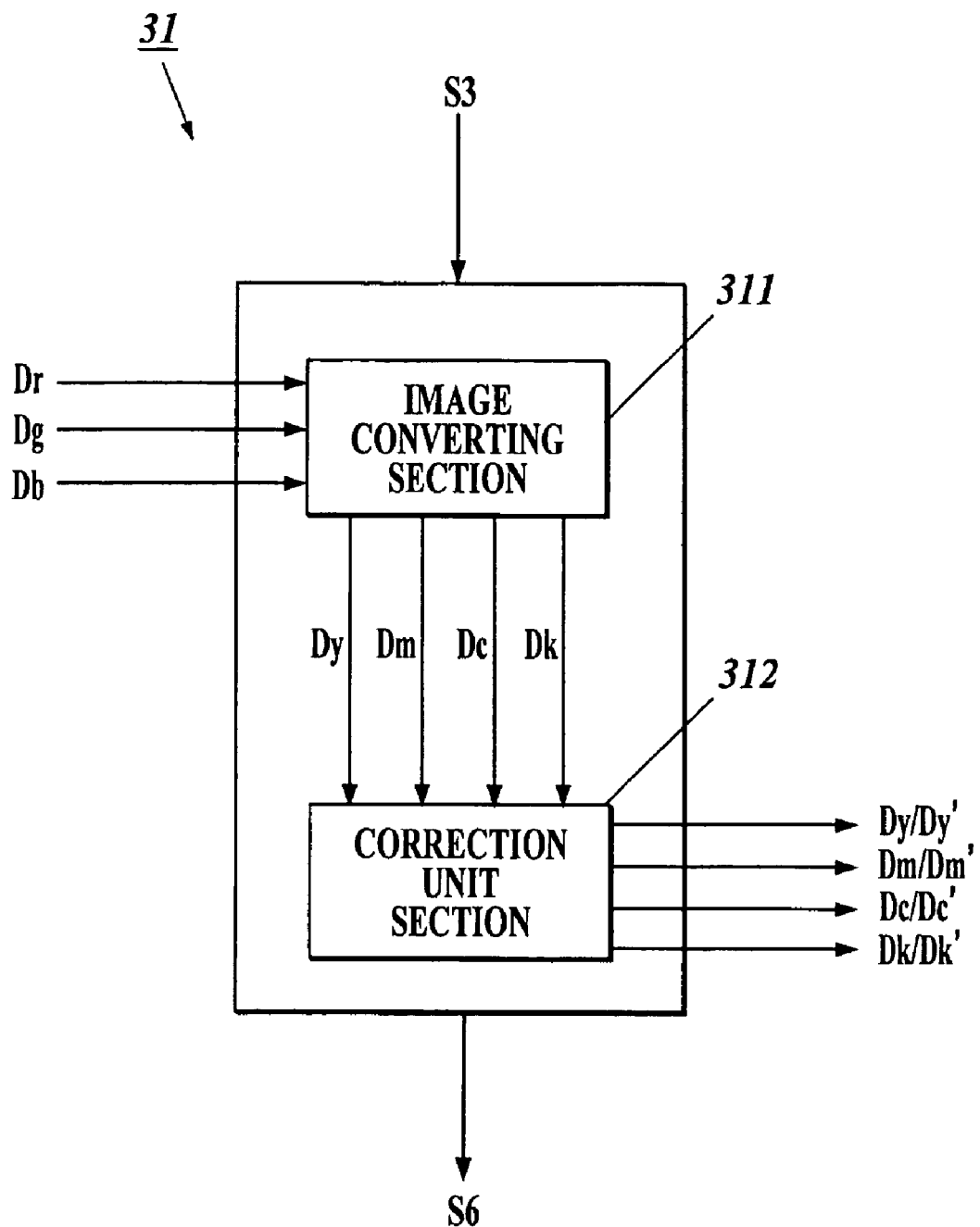
FIG. 5 is a block diagram schematically showing a structure of an image process section.
Figure 6:
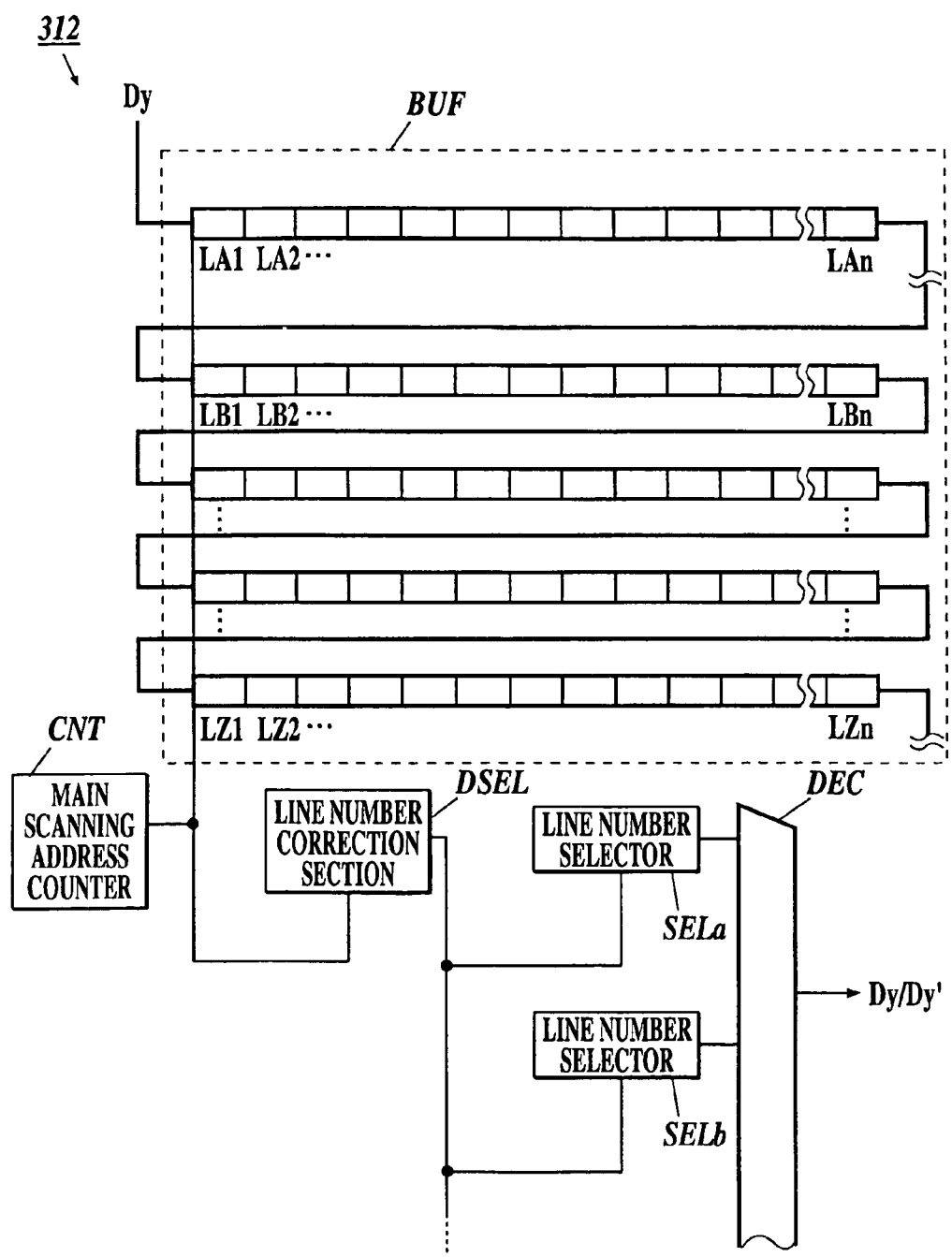
FIG. 6 is a block diagram schematically showing a structure of a correction section.
Figure 7:
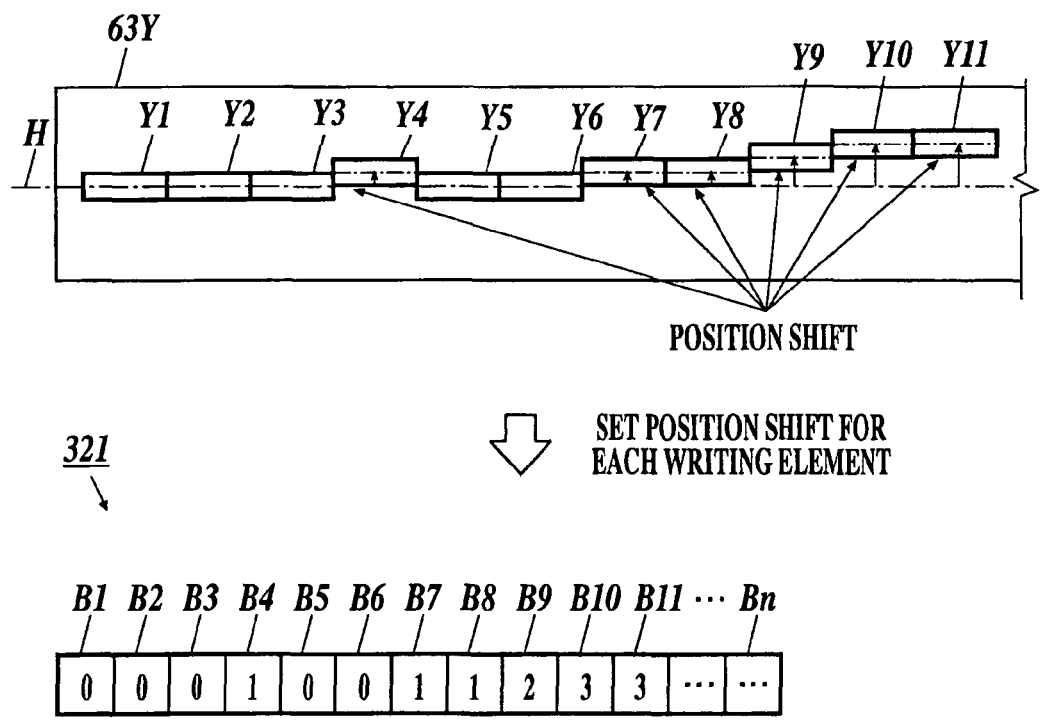
FIG. 7 is a schematic view schematically showing setting information according to a bow correction.

Next, the control system of the color copier 100 will be described with reference to FIGS. 3 to 9. FIG. 3 schematically shows a structure of the control system of the color copier 100. FIG. 4 exemplifies a structure of the control system of the color copier 100, the writing unit 3Y, 3M, 3C and 3K for each color of Y, M, C and K and the surrounding circuits thereof. FIG. 5 schematically exemplifies a structure of the image process section 31. FIG. 6 schematically exemplifies a structure of the correction section 312. FIG. 7 schematically shows the setting information according to the bow correction. FIG. 8 exemplifies the formed image after the bow correction is carried out. FIG. 9 exemplifies the outline of the skew correction.

As shown in FIG. 3, the color copier 100 comprises an image input section 11, a control section 15, a communication section 19, a conveyance section 20, an image process section 31, an image memory 36, an operation panel 48 and an image forming section 60.

The control section 15 comprises the ROM (Read Only Memory) 33, the RAM (Random Access Memory) 34 for work and the CPU (Central Processing Unit) 35. The system program data to control the entire color copier is stored in the ROM 33. The storage section 32 stores the setting information specific to the device such as the setting information 321 for each writing unit which is the information according to the arrangement condition of the light emitting elements specific to each writing unit, various types of setting information such as the image forming condition and the program data which can be executed by the control section 15 and the like. The RAM 34 provides the storage region for temporary storing the control command when the both surface mode is being executed and the storage region for operation in the after-mentioned operation process. When the power is turned on, the CPU 35 reads the system program data from the ROM 33 to activate the system and controls the entire color copier.

The operation panel 48 comprises the setting section 14 constituted of a touch panel and the display section 18 which is the LCD (Liquid Crystal Display) or the like, and accepts the displaying of the operation screen and the setting input under the control of the control section 15. The setting section 14 is connected to the above described control section 15 and accepts the operation input such as the paper type of the paper P in which the image is formed by the image forming section 60 and the image forming condition (setting of the image density, selection of the paper size, setting of number of sheets to be copied and the like) for one surface or for both surfaces and output to the control section 15.

Under the control of the control section 15, the setting content which is set by the operation panel 48 is stored by updating various types of setting information stored in the storage section 32 based on the instruction input which reflects the setting content after the setting content is temporarily stored in the working region in the RAM 34.

The color copier 100 may carry out the setting of the color mode to form the color image, the setting of the monochromatic mode to form the monochrome image and the setting of the auto determination mode (ACS: Auto Color Select) to automatically determine whether the input image data is the color image/the monochrome image or not by determining whether the data of each pixel unit is multivalued/binary or not. Further, the color copier 100 may carry out the setting of whether the skew correction/the bow correction is to be effective or not by the operation panel 48 at the time of setting of the monochromatic mode.

In this example, the system of the control bus 28, the data bus 29 and the like are connected to the above described CPU 35. The display section 18 is connected to the data bus 29. The display section 18 displays the preview image in which the document 30 is reduced based on the image data Din obtained by the image input section 11 and also displays the selection items and the like according to the image generation condition based on the display data D2 sent from the CPU 35. Here, the content of the setting which is set by the operation panel 48 such as the image forming condition, the paper type of the paper P in which the image is to be formed and the like is output to the CPU 35 as the operation data D3.

The storage section 32 is connected to the CPU 35 via the control bus 28 and the data bus 29. The storage section 32 stores the setting information 321 for each writing unit which is the information according to the arrangement condition of the light emitting elements specific to each writing unit and the setting information 322 for each mode which is the table data that stores the setting content set by the operation panel 48 for each setting item (type of paper, paper tray, image forming surface (back surface/front surface)) as the image forming condition.

In the setting information 321 for each writing unit stored in the storage section 32, the data table or the like which indicates the shifting amount of a chip unit in the sub-scanning direction/the main scanning direction which occurs when the chips in which the LEDs aligned by the semiconductor process are mounted are arranged on the substrate is stored, that is the shifting amount of the pixel arrangement from the ideal position which is attributed to the arrangement condition of the light emitting elements of each writing unit is stored. Particularly, the shifting amount of each light emitting element of each writing unit in the sub-scanning direction, that is the correction amount for carrying out the bow correction (the first correction) to correct an image which is formed in the main scanning direction and which is shifted in a bow form in the sub-scanning direction before the correction to an ideal straight line is stored.

Moreover, in the setting information 321 for each writing unit stored in the storage section 32, the data table or the like which indicates the shifting amount of the light emitting elements in the arrangement direction which occurs due to the error of the mounting position when each writing unit is mounted on the color copier 100, that is the shifting amount of the relative position (degree of inclination) of the pixels between each of the colors is stored. Particularly, the degree of inclination of the arrangement direction of the light emitting element in each writing unit with respect to the main scanning direction which is the correction amount for carrying out the skew correction (the second correction) to form the image which is formed in a straight line inclined in the main scanning direction before the correction in a stair-like form by shifting the image in the main scanning direction is stored.

Moreover, in the setting information 322 for each mode which is stored in the storage section 32, the setting and the like whether the bow correction/the skew correction is to be made effective or not at the time when the above described monochromatic mode is set for each item such as the type of the paper, the paper tray, the image forming surface (back surface/front surface) and the like are stored.

The image input section 11 is connected to the control bus 28 and the data bus 29. The analog/digital converter (omitted from the drawing) is provided at the image input section 11. The image input section 11 carries out the A/D conversion to the analog image reading signal which is read and obtained from the document 30 based on the reading control signal S1. The digital image data Din after the A/D conversion is carried out is transmitted to the image memory 36 which is connected to the control bus 28 and the data bus 29.

The image data Din is stored in the image memory 36 based on the memory control signal S2. For the image memory 36, the hard disk, the semiconductor storage memory and the like are used. The reading control signal S1 is output to the image input section 11 from the CPU 35 via the control bus 28, and similarly, the memory control signal S2 is output to each of the image memory 36 from the CPU 35. The CPU 35 executes the writing/reading control of the data in the image memory 36.

The three dimensional color information conversion table is stored in a memory (omitted from the drawing) in advance, and the image process section 31 converts the color of the image data Dout of the RGB color system read from the image memory 36 to the image data Dy, Dm, Dc and Dk of the YMCK color system based on the image process control signal S3 from the control section 15.

The image process section 31 supplies the image data to the writing unit 3Y and the like of the above described image forming section 60 in a line unit in the main scanning direction and in a pixel unit. For the image process section 31, the DSP (Digital Signal Processor), the RAM or the like are used. A working region (line buffer) to supply the image data in a line unit and in a pixel unit is provided in the RAM, and the line data in which the image process is carried out is temporarily stored in the working region before being supplied. Particularly, the working region is structured so as to store the line data corresponding to the image forming for one line in the main scanning direction in multiple stages.

In the color copier 100, the adjustment of the image forming position in the main scanning direction is carried out by shifting the reading position of the line data in the image process section 31 under the control of the control section 15. Similarly, in the color copier 100, the adjustment of the image forming position in the sub-scanning direction is carried out by delaying or foreseeing the number of stages to be read from the line data which is stored in the multiple stages in the image process section 31 under the control of the control section 15.

The image forming section 60 is connected to the control bus 28 and the data bus 29. The image forming section 60 is constituted with the image forming sections 10Y, 10M, 10C and 10K which are exemplified by referring to FIG. 1. In FIG. 3, only the image forming section 10Y for color Y is shown as an example. However, it is needless to say that the same description is applied for the other colors.

The image forming section 10Y which constitutes the image forming section 60 includes the writing unit 3Y in which a plurality of light emitting elements are arranged in a line form and the photoconductor drum 1Y in which an image is formed by the writing unit 3Y. In this example, the CPU 35 outputs the imaging control signal S4 to the image forming section 60 via the control bus 28.

The writing unit 3Y for color Y of the image forming section 60 operates so as to form a toner image for color Y on the photoconductor drum 1Y according to the input of the image data Dy for color Y in a line unit and the imaging control signal S4 under the control of the control section 15. In the writing unit 3Y, the LED light for forming one line of the Y color line is generated at once in respective strength level based on the image data Dy for one line. The LED light for color Y exposes light to one line of the photoconductor drum 1Y at once and forms the electrostatic latent image in a line form. The electrostatic latent image in a line form formed on the photoconductor drum 1Y is developed by the color Y toner member in the developing section 4Y which is described by referring to FIG. 1. The toner image in color Y which is developed by the developing section 4Y is transferred to the intermediate transfer body 6.

The conveyance section 20 is connected to the control bus 28, and the CPU 35 controls the paper trays 20A to 20C which are exemplified in FIG. 1 based on the paper feeding control signal S5. For example, the conveyance section 20 conveys the paper P to the image forming section 60 from any one of the paper trays 20A, 20B and 20C which is selected based on the paper feeding control signal S5. The paper feeding control signal S5 is supplied to the conveyance section 20 from the CPU 35.

The communication section 19 is connected to the data bus 29. The communication section 19 is connected to the communication circuit such as the LAN (Local Area Network) or the like, and is used when the communication process is carried out with the external computer, printer and the like. For example, when the document image read by the color copier 100 is output so that the image to be formed by the external printer or the like, the communication section 19 transmits the image data Dout' to the external printer. Here, under the control of the control section 15, the communication function of the communication section 19 is used even when the image data Din' generated in the external computer is accepted to carryout the print process for both surfaces in the image forming section 60.

Here, the portion relating to the control system of the color copier 100 which is also a structure of the writing units 3Y, 3M, 3C and 3K for each color of Y, M, C and K and the periphery circuit thereof will be described. As shown in FIG. 4, the image process section 31 is connected to the control section 15. The image process control signal S3 is supplied to the image process section 31 from the control section 15. The image process section 31 converts the digital image data Din (=Dr, Dg, Db) of the color components of color R, color G and color B to the writing data for LED writing based on the image process control signal S3. For example, the image process section 31 converts the image data Din to the image data Dy, Dm, Dc and Dk for colors Y, M, C and K by the three dimensional color information conversion table.

Moreover, when the image process control signal S3 including the correction amount of each writing unit is supplied by the control section 15 reading the setting information 321 for each writing unit, the image process section 31 converts the above mentioned image data Dy, Dm, Dc and Dk to the corrected image data Dy', Dm', Dc' and Dk' according to the correction amount and outputs the corrected image data.

In this example, the image process section 31 supplies the image data Dy or the image data Dy' to the resister array 61Y of the writing unit 3Y by a line unit and by a pixel unit.

Similarly, the image process section 31 supplies the image data Dm or the image data Dm' to the resister array 61M of the writing unit 3M by a line unit and by a pixel unit. Similarly, the image process section 31 supplies the image data Dc or the image data Dc' to the resister array 61C of the writing unit 3C by a line unit and by a pixel unit. Similarly, the image process section 31 supplies the image data Dk or the image data Dk' to the resister array 61K of the writing unit 3K by a line unit and by a pixel unit.

The timing generation circuit 38 is connected to the image process section 31. The image process section 31 supplies the timing generation control signal S6 to the timing generation circuit 38. The timing generation circuit 38 generates the register control signal SRy and the latch control signal SLy for color Y, the register control signal SRm and the latch control signal SLm for color M, the register control signal SRc and the latch control signal SLc for color C and the resister control signal SRk and the latch control signal SLk for color K based on the timing generation control signal S6, respectively.

The writing units 3Y, 3M, 3C and 3K for each of the colors Y, M, C and K are connected to the image process section 31 and the timing generation circuit 38. The writing unit 3Y comprises the resister array 61Y, the latch circuit 62Y and the LED head 63Y. The register array 61Y is connected to the above described image process section 31, and the image data Dy/Dy' for one line is orderly input based on the register control signal SRy and the image data Dy/Dy' is retained.

The latch circuit 62Y is connected to the register array 61Y, and the latch circuit 62Y operates so as to latch the image data Dy output from the register array 61Y based on the latch control signal SLy. The LED head 63Y is connected to the latch circuit 62Y. The laser drive power source Vy is connected to the LED head 63Y. The LED head 63Y generates the LED light for carrying out the line forming of color Y for one line in respective strength level based on the image data Dy/Dy' for one line which is supplied from the latch circuit 62Y at once.

The LED light for color Y exposes light to one line of the photoconductor drum 1Y at once and forms an electrostatic latent image in a line form. The electrostatic latent image in a line form formed on the photoconductor drum 1Y is developed as a toner image for color Y by the developing section 4Y shown by referring to FIG. 1. The toner image for color Y developed by the developing section 4Y is transferred to the intermediate transfer body 6.

The writing unit 3M comprises the register array 61M, the latch circuit 62M and the LED head 63M. The register array 61M is connected to the above described image process section 31, and the image data Dm/Dm' for one line is orderly input based on the register control signal SRm and the image data Dm/Dm' is retained.

The latch circuit 62M is connected to the register array 61M, and the latch circuit 62M operates so as to latch the image data Dm/Dm' which is output from the register allay 61M based on the latch control signal SLm. The LED head 63M is connected to the latch circuit 62M. The laser drive power source Vm is connected to the LED head 63M. The LED head 63M generates the LED light for carrying out the line forming of color M for one line in respective strength level based on the image data Dm/Dm' for one line which is supplied from the latch circuit 62M at once.

The LED light for color M exposes light to one line of the photoconductor drum 1M at once, and forms an electrostatic latent image in a line form. The electrostatic latent image in a line form which is formed on the photoconductor drum 1M is developed as a toner image for color M by the developing section 4M shown by referring to FIG. 1. The toner image for color M which is developed by the developing section 4M is transferred to the intermediate transfer body 6.

The writing unit 3C comprises the register array 61C, the latch circuit 62C and the LED head 63C. The register array 61C is connected to the above described image process section 31, and the image data Dc/Dc' for one line is orderly input based on the register control signal SRc and the image data Dc/Dc' is retained.

The latch circuit 62C is connected to the register array 61C, and the latch circuit 62C operates so as to latch the image data Dc/Dc' which is output from the register array 61C based on the latch control signal SLc. The LED head 63C is connected to the latch circuit 62C. The laser drive power source Vc is connected to the LED head 63C. The LED head 63C generates the LED light for carrying out the line forming of color C for one line, which is supplied from the latch circuit 62C, at once.

The LED light for color C exposes light to one line of the photoconductor drum 1C at once, and forms an electrostatic latent image in a line form. The electrostatic latent image in a line form which is formed on the photoconductor drum 1C is developed as a toner image for color C by the developing section 4C shown by referring to FIG. 1. The toner image for color C which is developed by the developing section 4C is transferred to the intermediate transfer body 6.

The writing unit 3K comprises the register array 61K, the latch circuit 62K and the LED head 63K. The register array 61K is connected to the above described image process section 31, and the image data Dk/Dk' for one line is orderly input based on the register control signal SRk and the image data Dk/Dk' is retained.

The latch circuit 62K is connected to the register array 61K, and the latch circuit 62K operates so as to latch the image data Dk/Dk' which is output from the register array 61K based on the latch control signal SLk. The LED head 63K is connected to the latch circuit 62K. The laser drive power source Vk is connected to the LED head 63K. The LED head 63K generates the LED light for carrying out the line forming of color K for one line, which is supplied from the latch circuit 62K, at once.

The LED light for color K exposes light to one line of the photoconductor drum 1K at once, and forms an electrostatic latent image in a line form. The electrostatic latent image in a line form which is formed on the photoconductor drum 1K is developed as a toner image for color K by the developing section 4K shown by referring to FIG. 1. The toner image for color K which is developed by the developing section 4K is transferred to the intermediate transfer body 6. The toner images which are orderly transferred to the intermediate transfer body 6 are transferred to a predetermined paper P and are made to form the color image.

Here, an inner structure of the image process section 31 which supplies the image data Dy/Dy', the image data Dm/Dm', the image data Dc/Dc' and the image data Dk/Dk' which are to be supplied to each writing unit for colors Y, M, C and K based on the image process control signal S3 from the control section 15 will be described in detail.

As shown in FIG. 5, the image process section 31 comprises the image converting section 311 and the correction section 312. The image converting section 311 includes a memory (omitted from the drawing) and the like which store information according to the color conversion such as the three dimensional color information conversion table and the like, and the image converting section 31 converts the image data Din (=Dr, Dg, Db) of the color component of color R, color G and color B to be input to the image data Dy, Dm, Dc and Dk for color Y, color M, color C and color K by referring to the three dimensional color information conversion table.

Here, the image converting unit 311 may have the structure in which the tone conversion is carried out by referring to the table data and the like for the tone conversion when converting the image data for each color of Y, M, C and K. Particularly, when each color Y, M, C and K has 256 tones, the tone is to be converted to 16 tones or to a monochrome.

The correction section 312 outputs the image data Dy', Dm', Dc' and Dk' which are the corrected image data Dy, Dm, Dc and Dk for color Y, color M, color C and color K based on the image process control signal S3 that includes the correction amount for carrying out the bow correction/the skew correction in each writing unit which is stored in the above mentioned setting information 321 for each writing unit. Here, when the correction amount for carrying out the bow correction/the skew correction is not included in the image process control signal S3, that is when the bow correction/the skew correction is not to be carried out under the control of the control section 15, the correction section 312 outputs the image data Dy, Dm, Dc and Dk as they are.

As shown in FIG. 6, the correction section 312 comprises a line buffer BUF, a main scanning address counter CNT, a line number correction section DSEL, line number selectors SELa, SELb . . . and a decoder DEC. Here, in the following description, only the structure relating to the image data Dy is exemplified, and descriptions relating to other colors which have approximately the same structure will be omitted.

The line buffer BUF includes the register LA1 to LAn and the register LB1 to LBn, . . . LZ1 to LZn in which the image data of each light emitting element for one line of the writing unit are stored so as to be arranged in multiple stages by each line. The main scanning address counter CNT indicates the address which is the reading position (for example, 1 to n in the register LA1 to LAn) on the line in the line buffer BUF according to the control signal. The line number selector SELa, SELb . . . indicates the reading line (for example, A to Z in the register LA1 to LAn, . . . LZ1 to LZn) in the line buffer BUF based on the control signal. The decoder DEC reads out the indicated reading line and the data stored in the address from the line buffer BUF to output as the image data Dy/Dy'.

The line number correction section DSEL carries out the correction of the reading line by the line number selectors SELa, SELb . . . based on the reading line/address of the line buffer BUF by the control signal and the correction amount of the bow correction/the skew correction in the main scanning direction.

As shown in FIG. 7, for example, the line number correction section DSEL is the correction amount relating to the bow correction. Further, the line number correction section DSEL outputs the image data Dy' in which the bow correction is carried out from the decoder DEC by carrying out the delaying/foreseeing of the reading line according to the address (1 to n) in the main scanning direction based on the setting information 321 for each writing unit which stores the displacement of the LED Y1, Y2 . . . in the LED head 63Y with respect to the reference position H which is the standard of the relative position of the LED head 63Y and the other LED heads as the bow correction information B1, B2, . . . Bn.

By carrying out the above described bow correction, the color copier 100 can adjust the image in the main scanning direction which is to be formed on the paper P by the writing unit 3Y based on the image data Dy which is before the bow correction is carried out to the image which meets the standard position H more as shown in FIG. 8. However, the bow correction cannot carry out the correction in case of not more than the resolution limit of the pixel unit, and jaggy in which the bow correction cannot be carried out may occur.

Moreover, as shown in FIG. 9, the line number correction section DSEL is the correction amount relating to the skew correction to be stored in the above mentioned setting information 321 for each writing unit. Further, the line number correction section DSEL outputs the image data Dy' in which the skew correction is carried out from the decoder DEC by carrying out the shifting of the reading line according to the address (1 to n) in the main scanning direction for each cycle which is set by the reciprocal of the inclining amount d based on the inclining amount d of the LED head 63Y with respect to the LED head reference position 63H which is the standard of the relative position of the LED head 63Y and the other LED heads.

As shown in FIG. 9, by carrying out the above described skew correction, the color copier 100 can adjust the inclination of the image in the main scanning direction which is to be formed on the paper P by the writing unit 3Y based on the image data Dy which is before the skew correction is carried out to the image in a stair-like form so as to meet the reference position H by orderly shifting by the cycle according to the inclination degree. However, the skew correction cannot carry out the correction in case of not more than the resolution limit of the pixel unit, and jaggy in which the skew correction cannot be carried out may occur.

Figure 10:
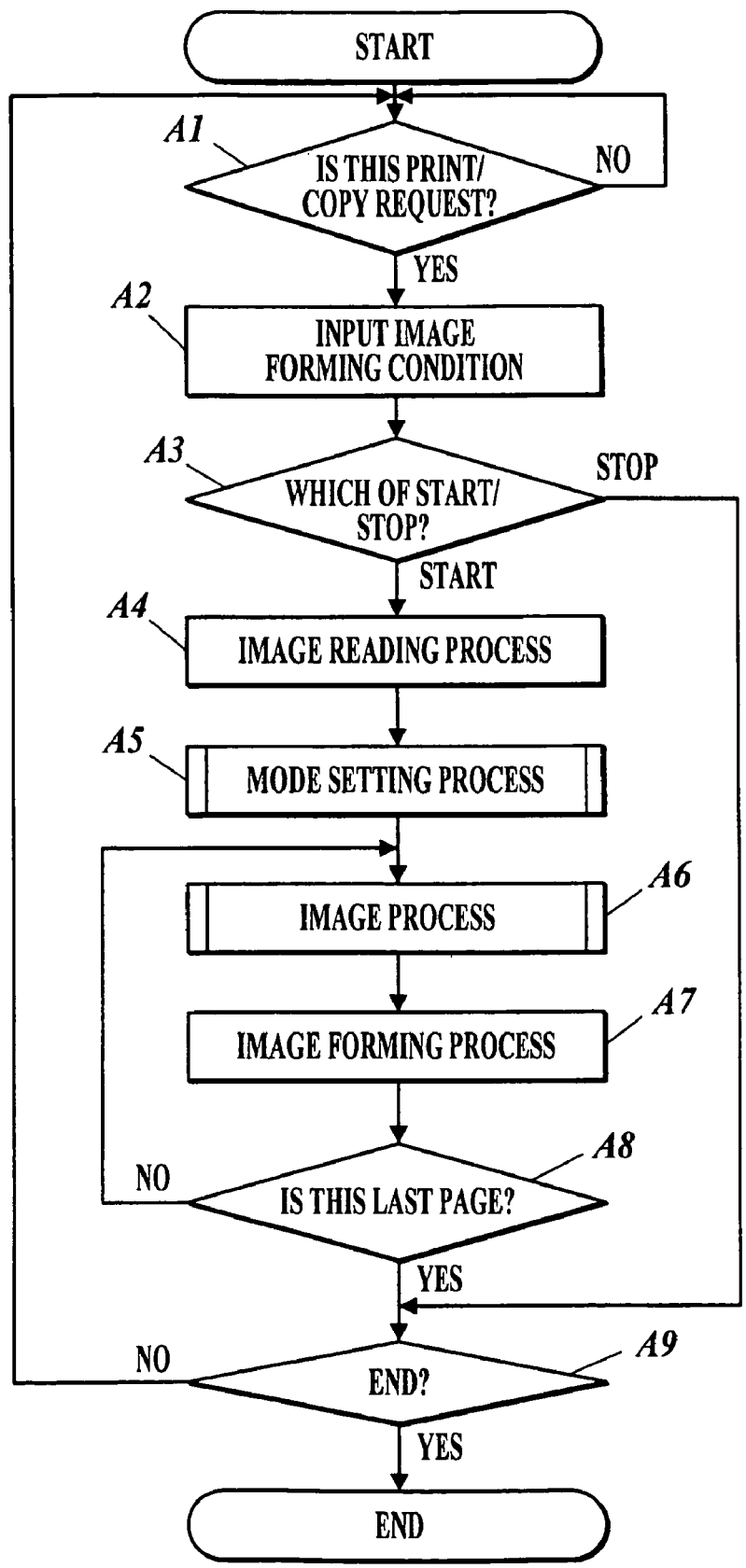
FIG. 10 is a flowchart exemplifying an operation of the color copier.
Figure 11:
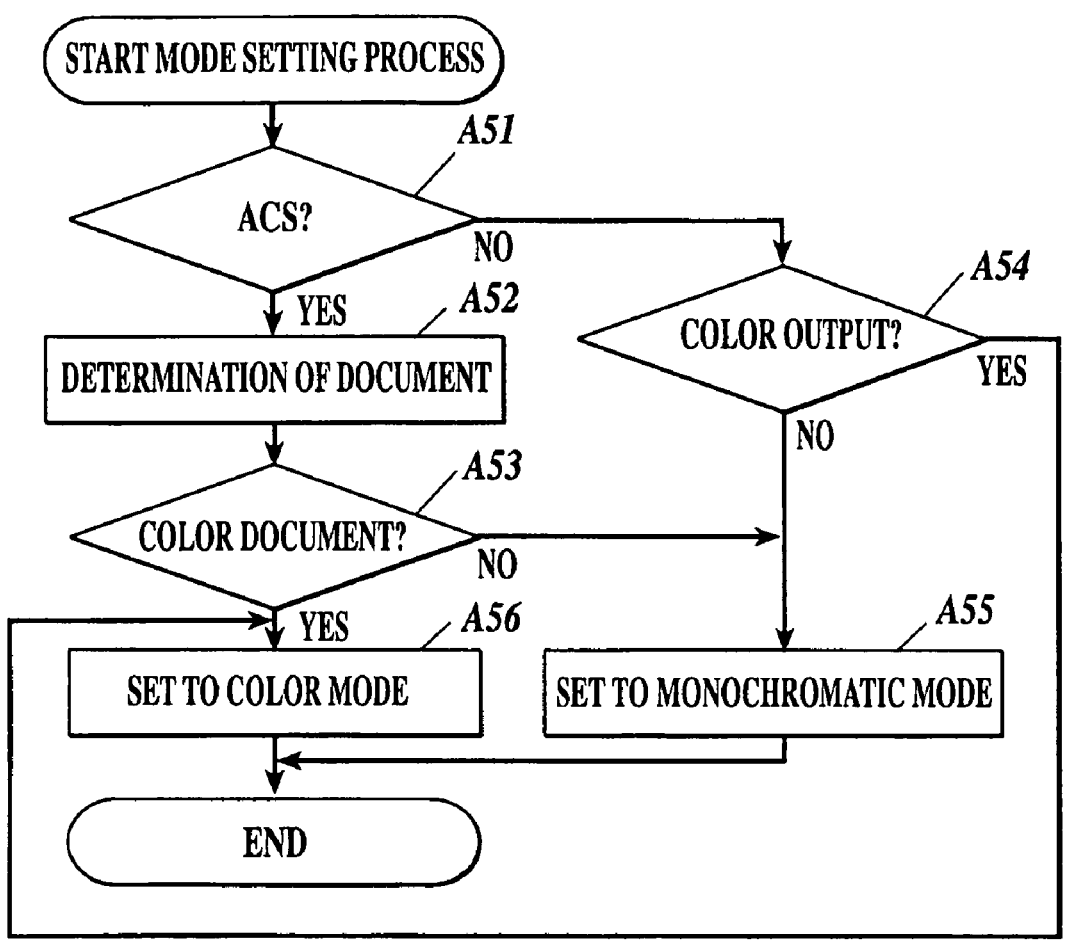
FIG. 11 is a flowchart exemplifying a content of a mode setting process.
Figure 12:
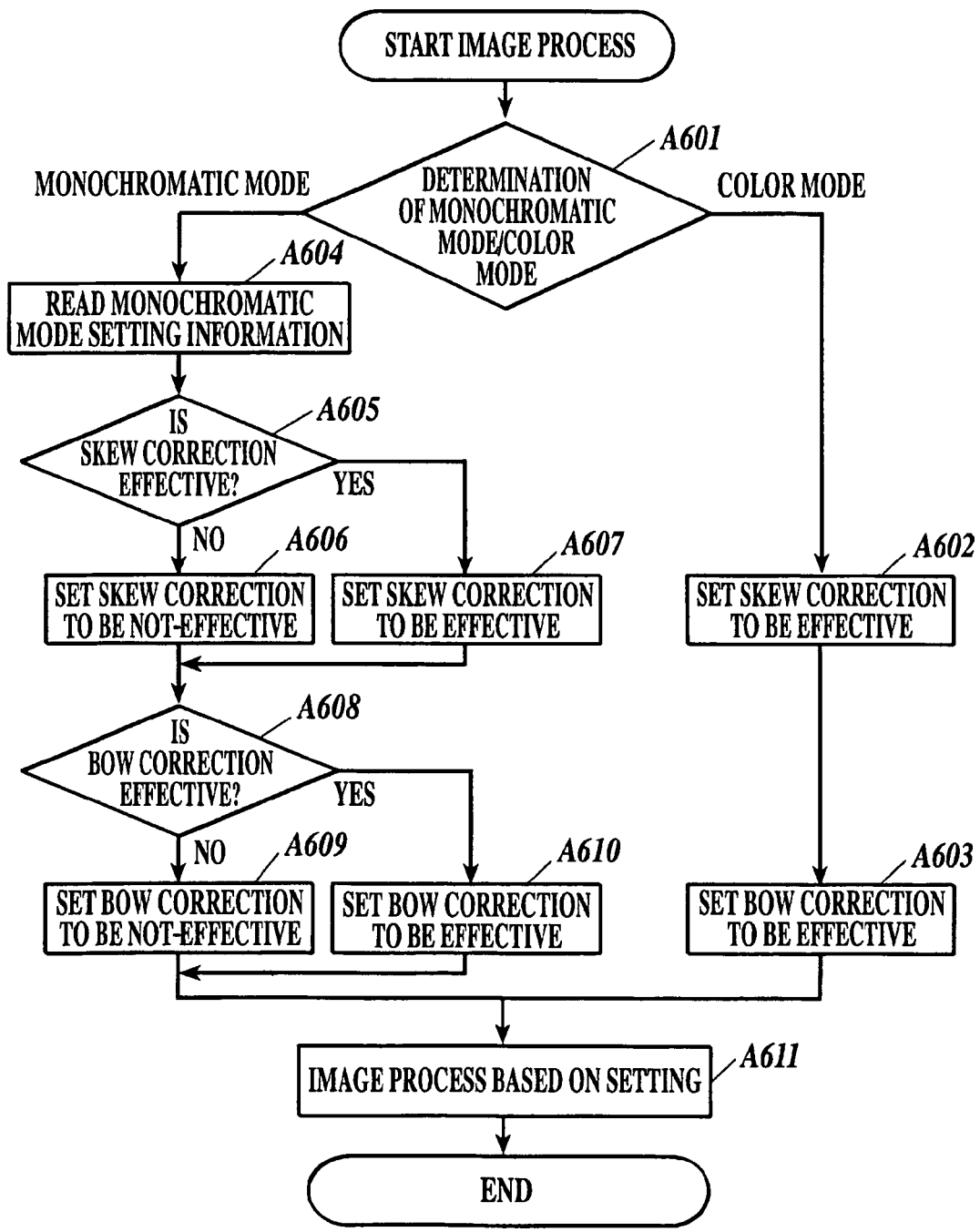
FIG. 12 is a flowchart exemplifying a content of an image process.

Next, the operation (image forming) of the color copier 100 which is carried out through the control by the control section 15 will be described in detail with reference to FIGS. 10 to 13. FIG. 10 shows the operations of the color copier 100 which are orderly carried out by the control section 15 in a flowchart. FIG. 11 shows the contents of the mode setting process which are orderly executed by the control section 15 in a flowchart. FIG. 12 shows the contents of the image process which are orderly carried out by the control section 15 in a flowchart. FIG. 13 exemplifies the formed images which are formed by the color copier 100.

As shown in FIG. 6, the control section 15 determines whether there is a print request from other computer via the communication section 19 or an image forming request such as print/copy or the like by the operation instruction from the operation panel 48, and waits the process until the request is met (step A1).

Here, the process based on the print request/copy request is approximately the same, and the only difference is that the image reading process is included in the process based on the copy request. Therefore, in the following description, only the process relating to the copy request will be described and the description relating to the print request will be omitted.

When the image forming request is made (step A1: Y), the control section 15 accepts the input of the image forming condition according to the request based on the communication via the communication section 19 or the input operation of the operation panel 48 and stores the information in the RAM 34 or the like (step A2).

Next, the control section 15 determines whether either one of start/stop of the process is instructed from the operation panel 48 or the like or not (step A3), and carries out the image reading process to read the image from the image input section 11 when it is instructed to start the process (step A4).

Then, the control section 15 carries out the mode setting process to set to the color mode to form a color image or to the monochromatic mode to form a monochrome image in the image forming section 60 by the determination of whether the image read in step A4 is the color image/the monochrome image or not or by the determination of whether the operation instruction by the operation panel 48 is the color mode/the monochromatic mode or not (step A5).

Particularly, as shown in FIG. 11, when the control section 15 determines whether it is ACS or not (step A51) and when it is ACS (YES), the control section 15 determines whether the document is a color document or a monochrome document based on whether the data of each pixel unit in the read image is multivalued/binary or not (step A52), and then the control section 15 determines whether the determination result of step A52 is the color document or not (step A53). Further, when the control section 15 determines that it is not ACS in step A51 (NO), the control section 15 determines whether the setting of the operation panel 48 is set to the color mode which carries out the color output by superimposing a plurality of colors or not (step A54).

Subsequently, when the control section 15 determines that the document is not a color document in step A53 (NO), or when the control section 15 determines that the color output is not to be carried out in step A54 (NO), the control section 15 sets the image forming mode in the image forming section 60 to the monochromatic mode (step A55). Further, when the control section 15 determines that the document is a color document in step A53 (YES), or when the control section 15 determines that the color output is to be carried out in step A54 (YES), the control section 15 sets the image forming mode in the image forming section 60 to the color mode (step A56).

Subsequently to step A5, the control section 15 controls the execution of the image process by the above mentioned image process section 31 by outputting the image process control signal S3 to the image process section 31 (step A6).

Particularly, as shown in FIG. 12, the control section 15 determines whether the image forming mode which is set in step A5 is either one of the monochromatic mode or the color mode or not (step A601). When the image forming mode is determined to be the color mode in step A601, the control section 15 sets the skew correction and the bow correction in the image process section 31 to be effective (step A602, A603).

When the image forming mode is determined to be the monochromatic mode in which the output colors are not superimposed in step A601, the control section 15 reads the setting information according to the monochromatic mode of the setting information 322 for each mode stored in the storage section 32 (step A604), determines whether to set the skew correction be effective or not based on the setting information (step A605), and sets the skew correction to be effective or not-effective based on the determination (step A606, A607).

Subsequently to steps A606 and A607, the control section 15 determines whether to set the bow correction be effective or not based on the setting information which is read in step A604 (step A608), and sets the bow correction to be effective or not-effective based on the determination (step A609, A610).

After the above described steps A601 to A610, the control section 15 makes the image process to be executed in the image process section 31 based on the setting of effective or not-effective of the skew correction or the bow correction. Particularly, when the skew correction or the bow correction is effective, the control section 15 makes the image process section 31 execute the skew correction or the bow correction by outputting the correction amount according to the skew correction or the bow correction stored in the setting information 321 for each writing unit to the image process section 31 by including the correction amount in the timing generation control signal S6. Further, when the skew correction or the bow correction is not-effective, the control section 15 makes the image process section 31 execute the normal image process which does not carry out the skew correction or the bow correction by outputting the timing generation control signal S6 which does not include the correction amount according to the skew correction or the bow correction to the image process section 31.

Subsequently to step A6, the control section 15 makes the image forming section 60 carry out the image forming process based on the image data in which the image process is carried out (image data Dy/Dy', image data Dm/Dm', image data Dc/Dc', and image data Dk/Dk') (step A7), and the control section 15 carries out the determination process to execute the image forming to the last page (step A8). After carrying out the image forming to the last page by the determination process, the control section 15 determines whether the process ending such as whether there is an instruction relating to the next process or not exists or not (step A9), and the process returns to step A1 when there is next process and the process is finished when next process does not exist.

As described above, according to a first preferred aspect of the present invention, the color copier 100 comprises the image forming section 60 which has a plurality of writing units in which the writing elements are arranged in the main scanning direction and which forms a color image by superimposing a plurality of colors on a paper which relatively moves in the sub-scanning direction by the plurality of writing units, the image process section 31 to convert the image data to be input to each driving data of the plurality of writing units, the correction section 312 to correct each of the driving data based on the information according to the arrangement of the writing elements of the plurality of writing units which is set in advance such as the setting information 321 for each writing unit, the operation panel 48 to set the operation mode according to the image forming in the image forming section 60 and the control section 15 to control the existence or nonexistence of correction in the correction section 312 based on the operation mode set by the operation panel 48.

Therefore, the color copier 100 can control the existence or nonexistence of the correction of the driving data for each of the plurality of writing units based on the setting information 321 for each writing unit according to the operation mode set by the operation panel 48, and also the improvement of jaggy can be attempted by controlling the correction by the setting of the operation mode when the jaggy occurs remarkably by the correction. For example, the jaggy due to the correction can be prevented from occurring by controlling so as not to carry out the correction in the setting of the operation mode.

As shown in FIG. 13, in the conventional color copier, the image G2a of color K in which the skew shift and the like are occurred with respect to the image G1 of color Y when the correction is not carried out is formed. Therefore, the image G2b of color K shifting lesser from the image G1 of color Y although the jaggy occurs in a certain degree by carrying out the correction of the skew correction and the like. Thus, it was possible to form the color image G3a with lesser color shift by superimposing the image G1 of color Y and the image G2b of color K to one another. Further, when the other color image is superimposed in such way, the color shift is noticeable than the jaggy which is occurred in any of the colors. Therefore, the jaggy in the image G2b of color K which occurred at the time of correction was not noticeable.

However, in the conventional color copier, the image G2b of color K was formed even when the image to be formed is a monochrome image and the like. In this case, the effect of superimposing cannot be obtained, and therefore, only jaggy is noticeable.

On the other hand, in the color copier 100, the correction can be controlled by the setting of the operation mode (monochromatic mode/color mode). Therefore, for example, the monochrome image G3b in which the correction that causes jaggy such as the skew correction is not carried out can be formed by arbitrarily setting the operation mode when the monochrome image is to be formed. Further, when the color image is to be formed, the color image G3a having lesser color shift in which the skew correction and the like are carried out can be formed by setting the operation mode by switching.

Moreover, preferably, the color copier 100 controls the correction section 312 so as not to carry out the correction in the monochromatic mode under the control of the control section 15. Thereby, the occurrence of jaggy which is especially noticeable when the monochrome image is formed comparing to when the color image is formed can be prevented.

Preferably, the color copier 100 controls the first correction (the bow correction) which corrects the shifting of each writing unit in the single unit in the sub-scanning direction from the ideal position based on the operation mode under the control of the control section 15. Therefore, the color copier 100 can attempt to improve the jaggy due to the correction by controlling the bow correction by the setting of the operation mode.

Preferably, the color copier 100 controls the second correction (the skew correction) which corrects the relative inclination of the arrangement of the writing elements in the sub-scanning direction in either one of the writing unit (for example, the writing unit 3Y) and in the other writing unit (for example, the writing unit 3K) based on the operation mode under the control of the control section 15. Therefore, the color copier 100 can attempt to improve the jaggy due to the correction by controlling the skew correction by the setting of the operation mode.

Preferably, the color copier 100 controls the bow correction or the skew correction based on the setting information (for example, the setting information 322 for each mode) according to the first correction (the bow correction) or the second correction (the skew correction) which corresponds to the operation mode under the control of the control section 15. Therefore, the color copier 100 can attempt to improve the jaggy due to the correction by independently controlling the bow correction or the skew correction by the setting of the operation mode.

Preferably, the color copier 100 carries out the image forming by forming an electrostatic latent image on the photoconductor drum by the image forming section 60 which carries out the image forming by the writing unit (for example, the writing unit 3Y) which has the light emitting elements arranged in the main scanning direction and by the image forming body (for example, the photoconductor drum 1Y) in which an image is formed by the writing unit, which is so-called the LED head writing optical system. Therefore, the jaggy can be attempted to be improved by controlling the correction by the setting of the operation mode.

Preferably, the color copier 100 carries out the image forming on the paper by using the writing elements which emit light based on the driving data. Therefore, the jaggy can be attempted to be improved by controlling the correction by the setting of the operation mode.

Here, the above described embodiment shows an example, and the present invention is not limited to this. The structure and the operation in the above described embodiment can be arbitrarily changed.

For example, in the above described embodiment, the structure of controlling the existence or nonexistence of the correction based on the setting of the operation mode is exemplified. However, the structure may be such that the existence or nonexistence of the correction is controlled by increasing or decreasing the correction amount. For example, when the operation mode is the monochromatic mode, the structure may be such that the correction amount is decreased in an amount just needed for the jaggy to be not noticeable. Here, in the structure where the existence or nonexistence of the correction is controlled by increasing or decreasing the correction amount, the structure of control will be same as the above described embodiment by setting the correction amount to 0 when the operation mode is the monochromatic mode.

The present U.S. patent application claims a priority under the Paris Convention of Japanese paten application No. 2007-177343 filed on Jul. 5, 2007, which shall be a basis of correction of an incorrect translation.

What is claimed is:

1. An image forming apparatus, comprising:
   an image forming section in which a plurality of writing units are disposed in a sub-scanning direction for each color, the writing units having writing elements arranged in a main scanning direction, and which forms a color image by superimposing an image of each color which is formed by using the plurality of writing units;
   an image converting section to convert an input image data to an image data of a color which corresponds to each of the plurality of writing units;
   a storage section to store information according to an arrangement of the writing elements for each writing unit;
   a correction section to correct an output timing for each pixel of the image data for each color which is converted by the image converting section based on the information according to the arrangement of the writing elements for each writing unit;
   a setting section to set an operation mode according to an image forming in the image forming section; and
   a control section to control a correction in the correction section based on the operation mode set by the setting section.

2. The image forming apparatus of claim 1, wherein
   the operation mode includes a color mode to form the color image by superimposing images of a plurality of colors and a monochromatic mode to form an image in monochrome without superimposing the plurality of colors, and
   the control section controls the correction section so as not to carry out the correction in the monochromatic mode.

3. The image forming apparatus of claim 1, wherein
   the storage section stores a data which indicates a shifting amount of each writing element of one writing unit in the sub-scanning direction from an ideal position of each writing element as the information, and
   the correction section corrects the output timing for each pixel of the image data based on the data which indicates the shifting amount of each writing element from the ideal position.

4. The image forming apparatus of claim 1, wherein
   the storage section stores a data indicating a relative degree of inclination of the arrangement of the writing elements in the sub-scanning direction for the one writing unit with respect to another writing unit as the information, and
   the correction section corrects the output timing of each pixel of the image data based on the data indicating the relative degree of inclination.

5. The image forming apparatus of claim 1, wherein
   the storage section stores setting information of whether to make the correction by the correction section effective or not-effective corresponding to each operation mode, and
   the control section controls whether the correction in the correction section is to be effective or not-effective based on the setting information.

6. The image forming apparatus of claim 1, wherein
   the writing elements are light emitting elements, and
   the image forming section comprises the writing units in which the light emitting elements are arranged in the main scanning direction and a plurality of image forming sections including an image forming body in which an image is written by the writing units.

7. The image forming apparatus of claim 1, wherein
   the writing elements are LED light emitting elements, and
   the LED light emitting elements are driven so as to emit light based on an image data in which the output timing is corrected by the correction section.

8. The image forming apparatus of claim 1, wherein
the correction section comprises a line buffer to store an image data for a plurality of lines, and
the output timing is corrected by selectively reading the image data for each line according to a correction amount.

9. A control method of an image forming apparatus, comprising:
determining whether an operation mode is a color mode or a monochromatic mode; and
controlling a correction in a correction section so as to be effective or not-effective based on a determination result in the determining, wherein
the image forming apparatus comprises
an image forming section in which a plurality of writing units are disposed in a sub-scanning direction for each color, the writing units having writing elements arranged in a main scanning direction, and which forms a color image by superimposing an image of each color which is formed by using the plurality of writing units;
an image converting section to convert an input image data to an image data of a color which corresponds to each of the plurality of writing units;
a storage section to store information according to an arrangement of the writing elements for each writing unit;
a correction section to correct an output timing for each pixel of the image data for each color which is converted by the image converting section based on the information according to the arrangement of the writing elements for each writing unit.

10. The control method of the image forming apparatus of claim 9, wherein
the operation mode includes a color mode to form the color image by superimposing images of a plurality of colors and a monochromatic mode to form an image in monochrome without superimposing the plurality of colors, and
the control section controls the correction section so as not to carry out the correction in the monochromatic mode.

11. The control method of the image forming apparatus of claim 9, wherein
the storage section stores a data which indicates a shifting amount of each writing element of one writing unit in the sub-scanning direction from an ideal position of each writing element as the information, and
the correction section corrects the output timing for each pixel of the image data based on the data which indicates the shifting amount of each writing element from the ideal position.

12. The control method of the image forming apparatus of claim 9, wherein
the storage section stores a data indicating a relative degree of inclination of the arrangement of the writing elements in the sub-scanning direction for the one writing unit with respect to another writing unit as the information, and
the correction section corrects the output timing of each pixel of the image data based on the data indicating the relative degree of inclination.

13. The control method of the image forming apparatus of claim 9, wherein
the storage section stores setting information of whether to make the correction by the correction section effective or not-effective corresponding to each operation mode, and
the control section controls whether the correction in the correction section is to be effective or not-effective based on the setting information.

14. The control method of the image forming apparatus of claim 9, wherein
the writing elements are light emitting elements, and
the image forming section comprises the writing units in which the light emitting elements are arranged in the main scanning direction and a plurality of image forming sections including an image forming body in which an image is written by the writing units.

15. The control method of the image forming apparatus of claim 9, wherein
the writing elements are LED light emitting elements, and
the LED light emitting elements are driven so as to emit light based on an image data in which the output timing is corrected by the correction section.

16. The control method of the image forming apparatus of claim 9, wherein
the correction section comprises a line buffer to store an image data for a plurality of lines, and
the output timing is corrected by selectively reading the image data for each line according to a correction amount.

17. A non-transitory computer readable storage medium storing a program to make a computer of an image forming apparatus realize functions of:
determining whether an operation mode is a color mode or a monochromatic mode; and
controlling a correction in a correction section so as to be effective or not-effective based on a determination result in the determining, wherein
the image forming apparatus comprises
an image forming section in which a plurality of writing units are disposed in a sub-scanning direction for each color, the writing units having writing elements arranged in a main scanning direction, and which forms a color image by superimposing an image of each color which is formed by using the plurality of writing units;
an image converting section to convert an input image data to an image data of a color which corresponds to each of the plurality of writing units;
a storage section to store information according to an arrangement of the writing elements for each writing unit;
a correction section to correct an output timing for each pixel of the image data for each color which is converted by the image converting section based on the information according to the arrangement of the writing elements for each writing unit.

* * * * *